United States Patent
Maekawa et al.

(10) Patent No.: US 6,903,832 B2
(45) Date of Patent: Jun. 7, 2005

(54) OUTPUT CONTROL APPARATUS, OUTPUT CONTROL METHOD AND MEMORY MEDIUM STORING PROGRAM READABLE BY COMPUTER

(75) Inventors: Shinichiro Maekawa, Kawasaki (JP); Hiromi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/907,957

(22) Filed: Aug. 11, 1997

(65) Prior Publication Data

US 2002/0054319 A1 May 9, 2002

(30) Foreign Application Priority Data

Aug. 23, 1996 (JP) .............................. 8-222236

(51) Int. Cl.⁷ ........................... G06F 3/12; G06F 13/00
(52) U.S. Cl. ..................................... 358/1.14; 358/1.15
(58) Field of Search .................. 358/1.14, 1.1, 358/1.2, 1.7, 1.8, 1.9, 1.13, 1.15, 501, 401, 402, 404, 426.09, 437, 438, 441, 296, 400; 399/18, 19, 60, 61, 62; 395/101, 102, 103, 112, 113, 114, 115, 116, 117, 200

(56) References Cited

U.S. PATENT DOCUMENTS

| | | | |
|---|---|---|---|
| 4,930,087 A | | 5/1990 | Egawa et al. .............. 364/518 |
| 4,999,654 A | | 3/1991 | Maruo et al. .............. 346/160 |
| 5,800,081 A | * | 9/1998 | Teradaira et al. ............. 400/74 |
| 5,812,283 A | * | 9/1998 | Tachibana et al. .......... 358/444 |
| 5,812,745 A | * | 9/1998 | Kim et al. .................. 395/113 |
| 5,872,635 A | * | 2/1999 | Akiyama .................... 358/296 |

FOREIGN PATENT DOCUMENTS

| | | |
|---|---|---|
| EP | 0654757 | 5/1995 |
| EP | 0661600 | 7/1995 |
| JP | 61-150435 | 7/1986 |
| JP | 2-231178 | 9/1990 |
| JP | 06-305219 | 11/1994 |
| JP | 06-320845 | 11/1994 |
| JP | 07-137358 | 5/1995 |
| JP | 08-295066 | 11/1996 |

* cited by examiner

*Primary Examiner*—Douglas Tran
(74) *Attorney, Agent, or Firm*—Fitzpatrick, Cella, Harper & Scinto

(57) ABSTRACT

An output control apparatus controls an output unit to output an image based on output data. The output unit provides a condition change signal indicating a predetermined condition change thereof. The apparatus includes detection means for detecting the condition change signal provided by the output unit, and transmission means for transmitting information on the predetermined condition change to an external apparatus in response to the detection means detecting the condition change signal.

23 Claims, 11 Drawing Sheets

OUTPUT CONTROL APPARATUS, OUTPUT CONTROL METHOD AND MEMORY MEDIUM STORING PROGRAM READABLE BY COMPUTER

BACKGROUND OF THE INVENTION

1. Field of the Invention

The present invention relates to an output control apparatus for effecting output control by data exchange with an external equipment.

2. Related Background Art

In the conventional laser beam printer, a printer controller unit executes the predetermined process by receiving information for example on the sheet transporting status, error information such as for the sheet jamming and an alarm such as for a low toner amount from the engine control unit through serial communication defined by the video interface.

In such conventional laser beam printer, however, the above-mentioned serial communication has to be made periodically or whenever necessary, for a status change which is not reflected in the ready (RDY) signal indicating that the engine control unit is in a standby state capable of the printing operation, and, in particular, such serial communication has always to be made in every printing operation when the automatic sheet feeding function is selected. Consequently such serial communication constitutes an overhead in the process.

Also the utility softwares on the external equipment ask the printer status by palling, so that the user becomes uneasy by the increase in the network traffic and by the slow response to the state change.

SUMMARY OF THE INVENTION

In consideration of the foregoing, there is provided, according to an embodiment of the present invention, an output control apparatus including an output unit for outputting the data received from an external equipment by conversion into an output image, comprising:

detection means for detecting the presence or absence of a change in the status of the output unit;

acquisition means for acquiring, in case the detection means detects a change in the status of the output unit, detailed information of the status in which the change is generated, from the output unit; and transmission control means for causing a transmission unit to transmit status information, based on the detailed information, to the external equipment.

Also according to another embodiment of the present invention, there is provided an output control method adapted for use in an output control apparatus including an output unit for outputting the data received from an external equipment by conversion into an output image, the method comprising steps of:

detecting the presence or absence of the change in the status of the output unit;

acquiring, in case the detecting step detects a change in the status of the output unit, detailed information of the status in which the change is generated, from the output unit; and controlling a transmission unit to transmit status information, based on the detailed information, to the external equipment.

Also according to still another embodiment of the present invention, there is provided a memory medium storing a program readable by a computer and adapted for use in an output control apparatus including an output unit for outputting the data received from an external equipment by conversion into an output image, the program comprising:

a detection step of detecting the presence or absence of the change in the status of the output unit;

an acquisition step of acquiring, in case the detecting step detects a change in the status of the output unit, detailed information of the status in which the change is generated, from the output unit; and a transmission control step of controlling a transmission unit to transmit status information, based on the detailed information, to the external equipment.

Still other objects of the present invention, and the features thereof, will become fully apparent from the following description which is to be taken in conjunction with the attached drawings.

DESCRIPTION OF THE PREFERRED EMBODIMENTS

In the following the present invention will be explained by an embodiment thereof.

Figure 1:
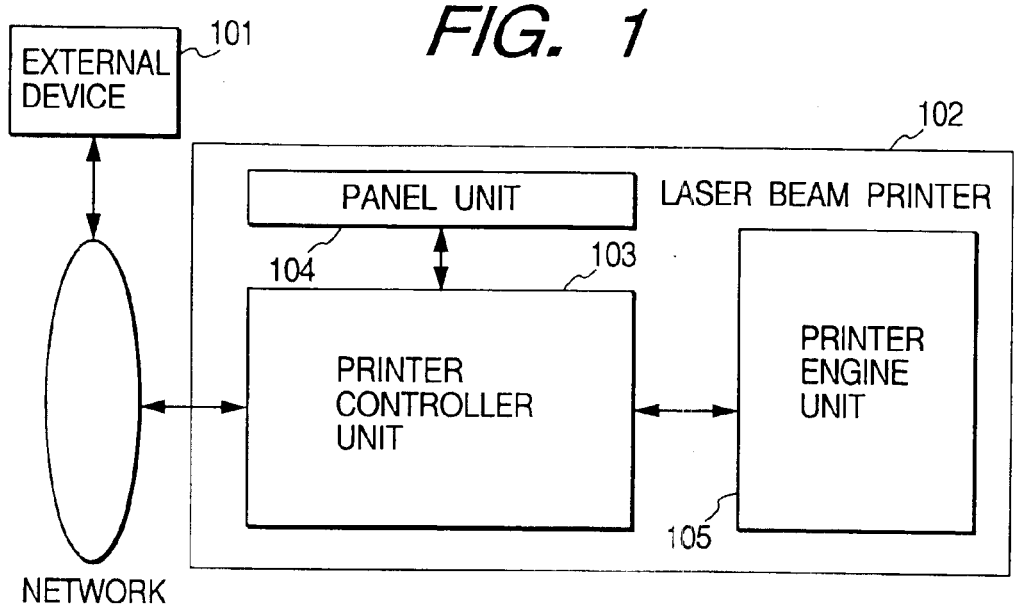
FIG. 1 is a block diagram showing the entire configuration of a system including a printer in which the present invention is applicable.

FIG. 1 shows the configuration of a system including a printer constituting an embodiment of the present invention.

The laser beam printer is widely employed as the output device for the computers. In the following there will be explained, with reference to FIG. 1, an output control system employing a utility software on the host computer and an electrophotographic printer (laser beam printer), which constitute the present invention.

Referring to FIG. 1, there is shown an external device 101 in which the utility software, constituting a part of the image forming system, functions.

There is also shown a laser beam printer 102, in which the present embodiment is applied. The external device 101 is connected to the laser beam printer 102 through a network.

A printer controller unit 103 executes communication with and reception of image data from a host computer, development of the received image data into information printable by the printer, and exchange of signals and serial communication with a printer engine control unit to be explained later. The printer controller unit 103 is connected to a printer engine, and executes reception of code data (ESC codes, various PDL etc.) from the external device 101 such as the host computer, generation of page information, consisting of dot data, from such code data, and transmission of the image data to the printer engine 105 through predetermined interface means.

A panel unit 104 constitutes an interface with the user. The user can instruct predetermined operations to the printer 102, by manipulating the panel unit 104 or the utility image of the external device 101.

A printer engine unit 105 executes formation of a latent image on a photosensitive drum by a known electrophotographic process and based on the image data (binary or multi-value data), developing, transferring and fixing such latent image onto a sheet thereby obtaining a print.

There are also shown an engine control unit 150 for controlling the units of the printer engine through signal exchange and serial communication with the printer controller; a sheet size detection unit 151 for detecting the size of the sheet in a cassette and transmitting the obtained information to the engine control unit; a paper feed unit sheet presence/absence detection unit 152 for detecting the presence or absence of paper in cassettes, a manual feeder, an optional cassette and an envelope feeder and transmitting the obtained information to the engine control unit; an option presence/absence detection unit 153 for confirming the connection status of the optional cassette and the envelope feeder; a sheet transport control unit 154 for effecting sheet transport control; an optical system control unit 155 for controlling the optical system such as a scanner motor, a laser etc.; a fixing temperature control unit 156 for effecting temperature control and abnormality detection of a fixing unit; an option control unit 157 for giving instructions for operation to the options including the optional cassette and the envelope feeder; and a sensor input unit 158 for detecting the presence or absence of sheet in transport paths for sheet registration, sheet discharge, two-side copying and sheet inversion.

Figure 2:
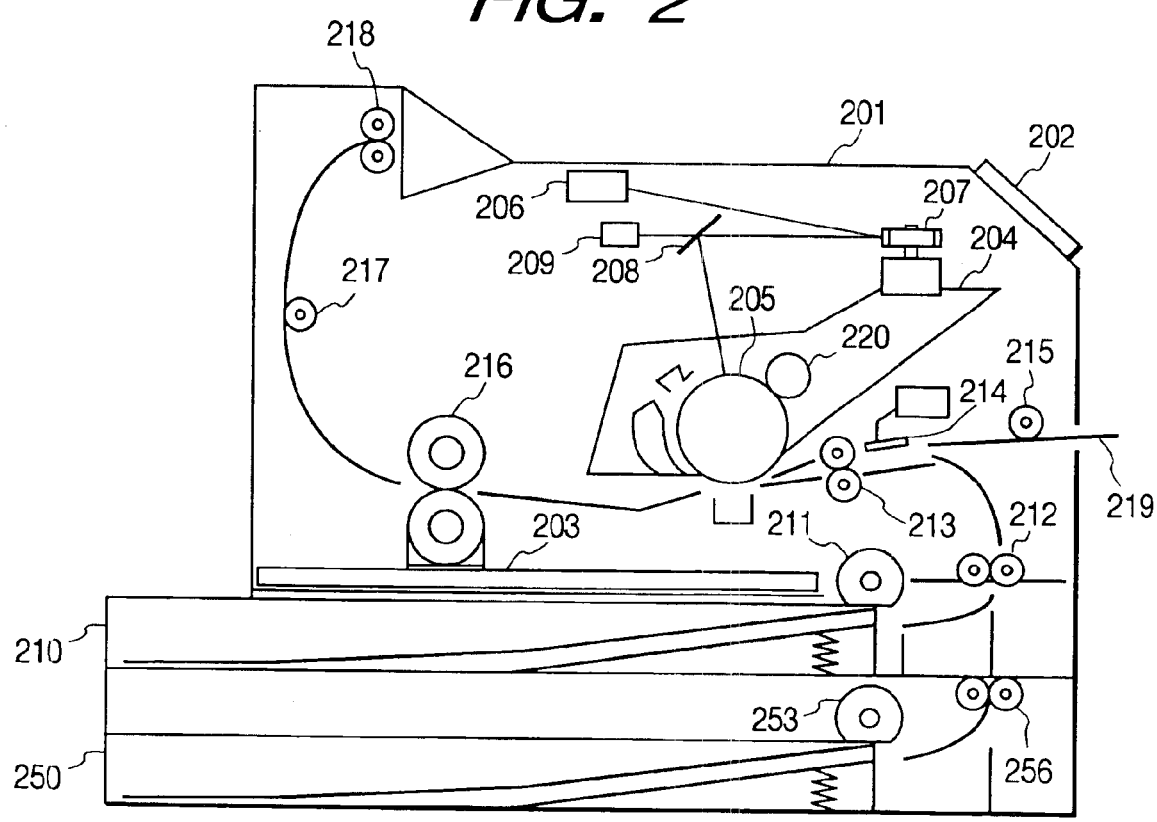
FIG. 2 is a schematic view showing a sheet transporting mechanism of a printer in which the present invention is applicable.

FIG. 2 is a schematic view showing the mechanical configuration of the printer of the present embodiment.

In FIG. 2 there are shown a printer casing 201 and an operation panel 204, which is provided with operation switches, LED displays and an LCD display, representing a material form of the panel unit 104 shown in FIG. 1. A control board unit 203 contains a printer engine unit 105 for controlling the printing process control of the printer and a printer controller unit 103 for analyzing the data from a host computer for conversion into image data.

A sheet cassette 210 containing sheets is provided with a mechanism for electrically detecting the sheet size by an unrepresented partition plate. A cassette sheet feeding clutch 211 is composed of a cam wheel member for separating the uppermost one of the sheets stacked on the sheet cassette 210 and transporting the separated sheet by unrepresented drive means to sheet feed rollers 211, and is rotated intermittently at each sheet feeding to feed a sheet by each rotation. A registration shutter 214 stops the sheet feeding by pressing the sheet. The sheet feed rollers 212 transports the sheet until the front end thereof reaches the registration shutter.

A sheet cassette 250 containing sheets is provided with a mechanism for electrically detecting the sheet size by an unrepresented partition plate. A cassette sheet feeding clutch 253 is composed of a cam wheel member for separating the uppermost one of the sheets stacked on the sheet cassette 250 and transporting the separated sheet by unrepresented drive means to sheet feed rollers 256, and is rotated intermittently at each sheet feeding to feed a sheet by each rotation. The sheet feed rollers 256 transports the sheet to the sheet feed rollers 212.

There are also provided a manual insert tray 219 and a manual feed sheet feed clutch 215, which transports the sheet until the front end thereof reaches the registration shutter 214.

The above-explained mechanisms allow to selectively feed the sheet from the sheet cassettes 210, 250 and the manual insert tray 219. The printer engine 105 effects communication with the printer controller unit 103 according to a predetermined communication protocol, determines the sheet feeding means from the cassettes 210, 250 and the manual insertion tray 219 according to an instruction from the printer controller 103, and initiates sheet feeding to the registration shutter 214 in response to a print start command.

A cartridge 204 is provided with a photosensitive drum 205 and an unrepresented toner containing unit. There are also provided a laser driver 206, a rotary polygon mirror 207, a mirror 208, and a beam detector 209. When the sheet is transported to the registration shutter 214, a laser beam, emitted from an unrepresented semiconductor laser which is on-off driven by a laser driver according to the image data transmitted from the printer controller 103, is deflected in the main scanning direction by the rotary polygon mirror 207 and is focused onto the photosensitive drum 205, thereby achieving scanning in the main scanning direction and forming a latent image on the main scanning line. In synchronization with the emission of the laser beam, the registration shutter 214 is driven upwards whereby the sheet is transported in synchronization with the sub scanning of the laser beam. The beam detector 209, positioned at the scanning start position of the laser beam, generates a synchronization signal for determining the start timing of the image recording in the main scanning direction by detecting the laser beam, and supplies the printer controller 103 with such synchronization signal. Then the sheet is transported by transport rollers 213 while the photosensitive drum is rotated by an unrepresented motor, and the latent image is rendered visible as a toner image by a developing unit 220 and is transferred onto the sheet. The sheet bearing the transferred toner image is subjected to thermal fixation of the toner image by fixing rollers 216, then transported by transport rollers 217 and is discharged by discharge rollers 218 onto a discharge tray of the printer casing.

Figure 3:
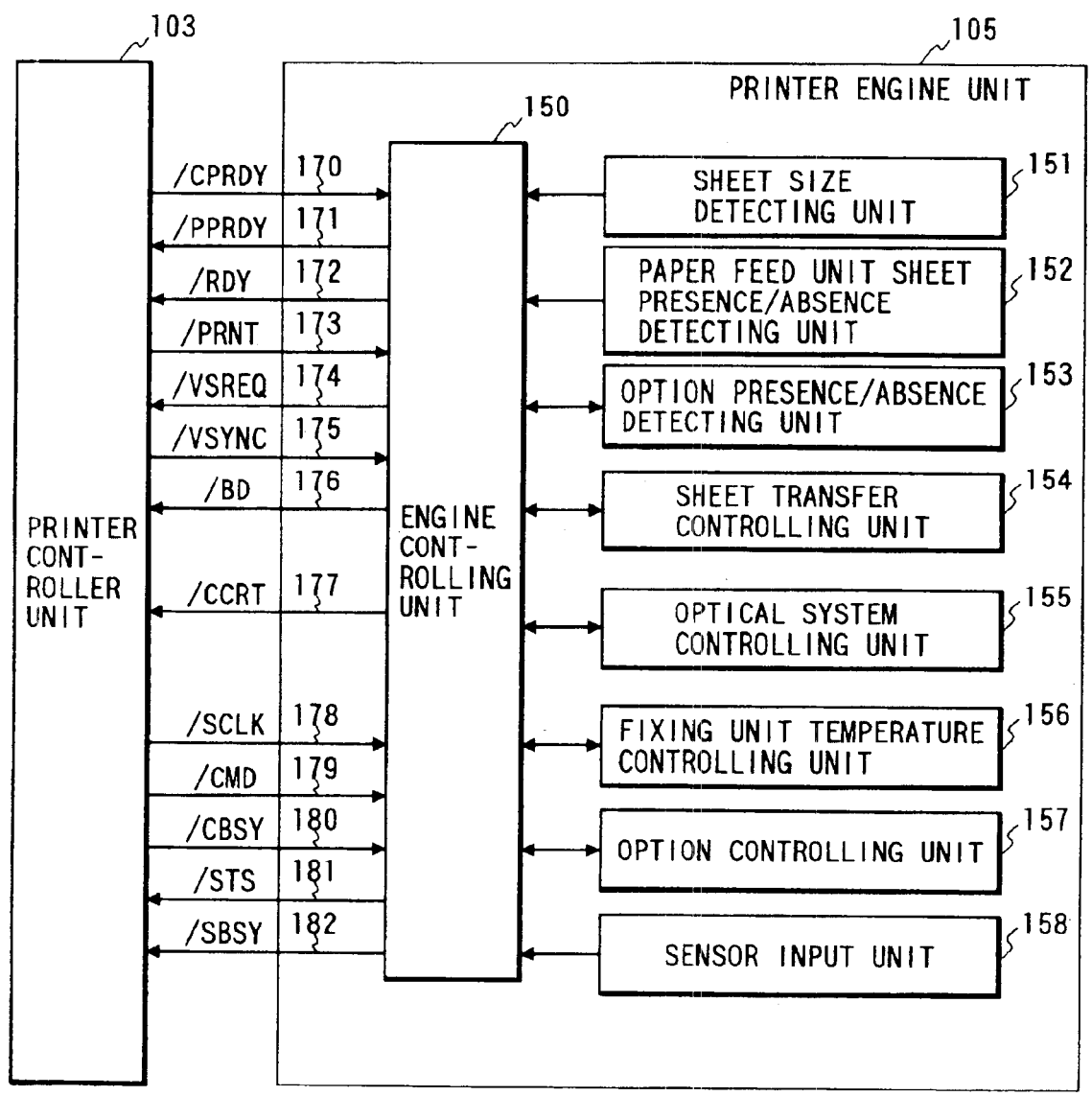
FIG. 3 is a block diagram showing the electrical configuration of a printer in which the present invention is applicable.

FIG. 3 is a block diagram showing interface (hereinafter called video interface) between the printer controller 103 and the printer engine 105, and interior of the printer engine.

The printer controller 103 effects communication with the host computer, reception of the image data and development of the received image data into information printable by the printer as explained before, and also executes signal exchange and serial communication with a printer engine controller to be explained later. In this drawing, components 105, 150 to 158 correspond to those shown in FIG. 1.

In the following there will be explained signals exchanged between the printer controller 103 and the engine controller 150.

A /CPRDY signal 170 indicates that the printer controller 103 is in a state capable of communication with the engine controller 150.

A /PPRDY signal 171 indicates that the engine controller 202 is in a standby state capable of communication with the printer controller 103. A /RDY signal 172 indicates that the engine controller 202 is in a standby state capable of printing operation. A /PRNT signal 173 is a print request from the printer controller 103 to the engine controller 202. A /VSREQ signal 174 is a request for a vertical synchronization signal from the engine controllers 202 to the printer controller 103. A /VSYNC signal 175 is a vertical synchronization signal supplied from the printer controller 103 to the engine controller 202. A /BD signal 176 is a horizontal synchronization signal supplied from the engine controller 202 to the printer controller 103. A /SCLK signal 178 is a synchronization clock signal used for serial communication. A /CMD signal 179 is a command signal for instruction from the printer controller 103 to the engine controller 202. A /CBSY signal 180 is a strobe signal for command output. A /STS signal 181 indicates the status of the engine and is outputted in response to a command from the printer controller 103. A /SBSY signal 182 is used for status output.

A /CCRT (condition change report) signal 177 becomes "true" in case of a change in the content of the status not directly related to the /RDY signal, thereby informing the printer controller 103 of such change.

The printer controller 103 executes status search by the /CCRT signal according to the following protocols 1 and 2.

[Protocol 1]

The printer controller 103 checkes the /RDY signal 172 and the /CCRT signal 177 and starts reading the status information in case of a change in these signals. In case the /CCRT signal 177 is "false" and the /RDY signal 172 becomes "false" also, there is at first checked the status of the contents such as misprint, wait state, sleep state, operator call etc. Then, according to the result of such check, details are confirmed by referring to the lower status corresponding to each bit;

[Protocol 2]

On the other hand, in case the /CCRT signals becomes "true", the printer controller 103 reads, from the engine controller 150, the status such as of a change in the sheet size, in the presence/absence of the sheet feeding units, in the function of the sheet feeding units, in the content of alarm etc. thereby recognizing the kind of the changed status, and recognizes the details by reading the status of such group in succession.

The resetting procedure of the engine controller 150 for the /CCRT signal 177 is as follows.

The engine controller 150 constantly checks the change in the status of the various parts of the engine, namely a change in the sheet size, a change in the presence/absence of the sheets, a change in the function of the sheet feeding units and a change in the state of alarm, at a predetermined interval.

In case of a change in the status, the value of the state change status corresponding to each status is set at "1", and the hard /CCRT signal 177 is set at "true".

Then, in response to a status request command from the printer controller 103, the engine controller 150 sends status information to the printer controller 103 and sets the /CCRT signal 177 at "false".

Figure 4:
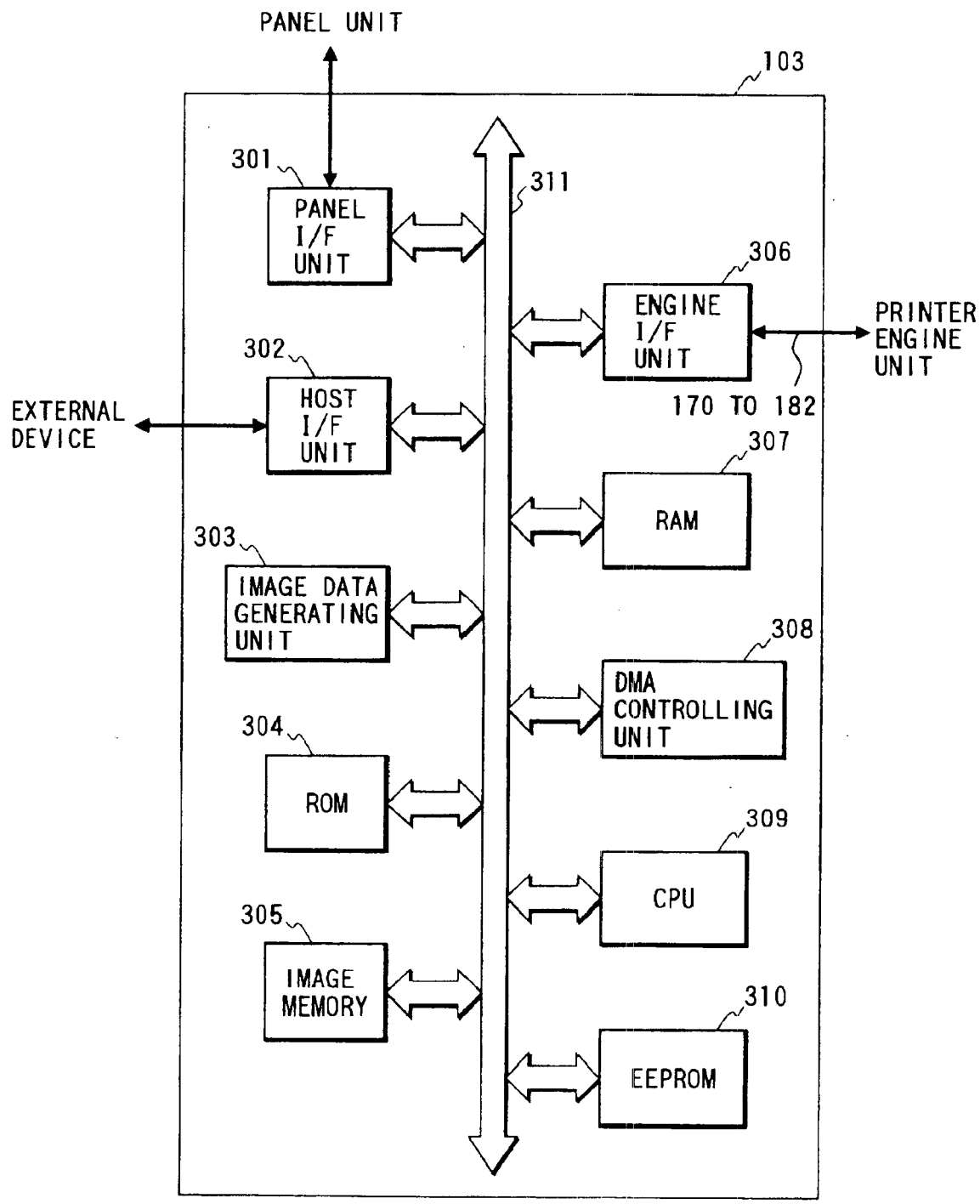
FIG. 4 is a block diagram showing the electrical configuration of a printer controller in which the present invention is applicable.

FIG. 4 is a block diagram of the printer controller 103 of the present embodiment.

There are shown a panel interface 301 for receiving various settings and instructions of the operator from the panel 104 by data communication therewith; a host interface 302 constituting a signal input/output unit with an external device 101 such as a host computer through a network; and an engine interface 306 constituting a signal input/output unit with the printer engine 105 and effecting data signal transmission from an unrepresented output buffer register and control for the communication with the printer engine 105 (by detecting or driving signal lines 170 to 182).

There are also provided an image data generation unit 303 for generating bit map data for actual printing based on the control code data transmitted from the external device 101; an image memory 305 for storing the image data; a CPU 309 for controlling the entire printer controller 103; a ROM 304 for storing control codes for the CPU 309; a RAM 307 used as a temporary memory to be used by the CPU; an EEPROM 310 constituting non-volatile memory means; and a DMA control unit 308 for transferring the bit map data from the image memory to the engine interface 306 in response to an instruction from the CPU 309.

A system bus 311 includes an address bus and a data bus. The panel interface 301, the host interface 302, the image data generation unit 303, the ROM 304, the image memory 305, the engine interface 306, the RAM 307, the DMA control unit 308, the CPU 309 and the EEPROM 310 are connected to the system bus 311, whereby access is enabled to all the function units present on the system bus 311.

Figure 5:
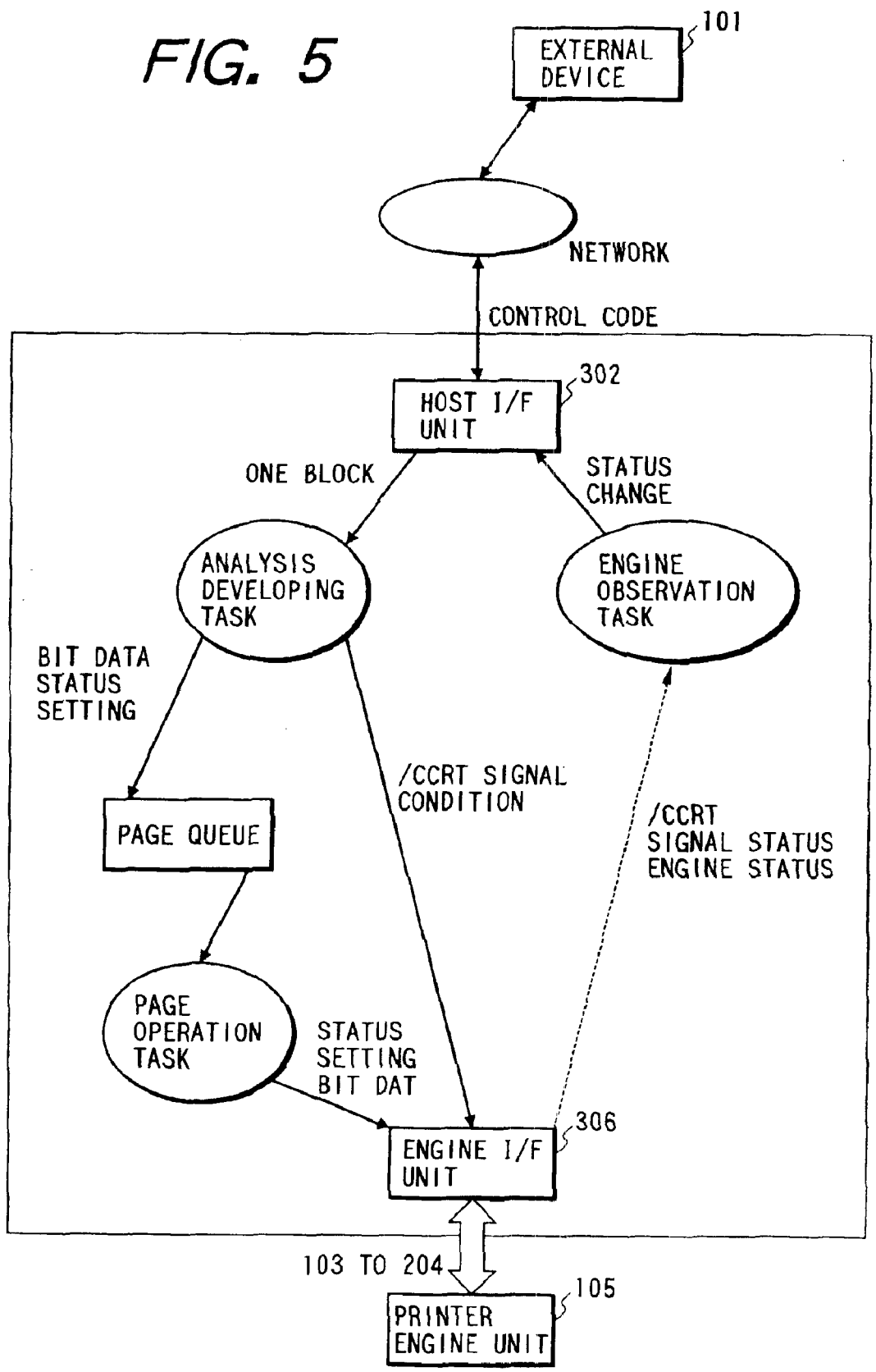
FIG. 5 is a view showing the data flow in an embodiment of the present invention.

FIG. 5 shows the data flow in the present embodiment.

The control code for controlling the CPU 309 is assumed to be composed of an OS for effecting time-shared control in the unit of a load module, called task, according to an unrepresented clock signal, and plural load modules (tasks) functioning in the unit for each function. An analysis developing task, a page operation task and an engine monitoring task shown in FIG. 5 are based on the CPU 309 as explained above and are logically executed in parallel manner.

In the following there will be explained the data flow shown in FIG. 5.

The print data (control code, PDL etc.) entered from the external device 101 through the network are stored in the unit of a predetermined block, in the host interface 302. Upon detecting the data in the host interface 302, the analysis developing task acquires an unrepresented page table. Then it analyzes the data in the unit of the above-mentioned block, then executes image development by utilizing the image data generation unit 303 (not shown in FIG. 4) for the image forming information (PDL drawing command or character code) or by the CPU 309 itself and stores the developed data in an area of the page table, indicated by a "raster pointer". Also it stores the control information for the printer (such as copy number, sheet feeding selection etc.) in the page table. After the development of data of a page, the status "end of development" is rendered "true" and a page cue of FIFO structure is encued.

Also in case an instruction for designating the condition of change of the CCRT signal, such condition is immediately informed to the printer engine 105.

The page operating task simultaneously monitors the "status flags" of all the pages in the above-mentioned page cue, and executes the printing by varying the transporting procedure according to the status. In this operation, the engine interface 306 executes the setting of the sheet feeding means etc. on the printer engine 105. When the "discharge completion flag" is changed to "true", the page table is decued by the page cue, whereby the page management function is returned.

The engine monitoring task executes communication, at a predetermined interval, with the printer engine 105 through the engine interface 306, and renews the "status flags" when a factor causing a change in the page status is generated.

On the other hand, it monitors a change in the /RDY signal 401, and, in response to a change from "true" to "false", it recognizes the printer status as an error status and monitors the release of such error.

It also monitors a change in the /RDY signal 401 and the /CCRT signal 402, and renews the above-mentioned "engine status table" in response to the protocols 1 and 2 explained in the foregoing in relation to FIG. 3.

Also the printer controller 103 transmits the changed status to a utility software on the external device 101, through the network.

An unrepresented utility software is present on the external device 101 and, in response to the reception of the status from the printer controller 103, executes a responsive operation for example on the display of the external device 101.

Also the utility software on the external device 101 informs the printer, which is newly connected to the network or is newly switched on, with predetermined change conditions for the CCRT signal (selection of the status changes for generating the CCRT signal from the engine controller 105 to the printer controller 103 among the status changes such as the change in the sheet size, in the presence/absence of the sheet feeding units, in the function of the sheet feeding units, in the content of alarm etc.). The set values for the change conditions for the CCRT signal are predetermined on the utility software.

An operation mode instruction (copy number, selection of sheet feeding etc.) from the panel unit 104 is temporarily stored in the panel interface 301. An unrepresented printer control task cyclically monitors the panel interface 301 at a predetermined interval, and, in the presence of data, stores such data in the EEPROM 310 and at the same time stores such data as control data in an unrepresented control data area of the RAM 307. The data storage in the EEPROM 310 allows to operate the printer in the desired mode, even after the power supply of the printer is once turned off.

Figure 6:
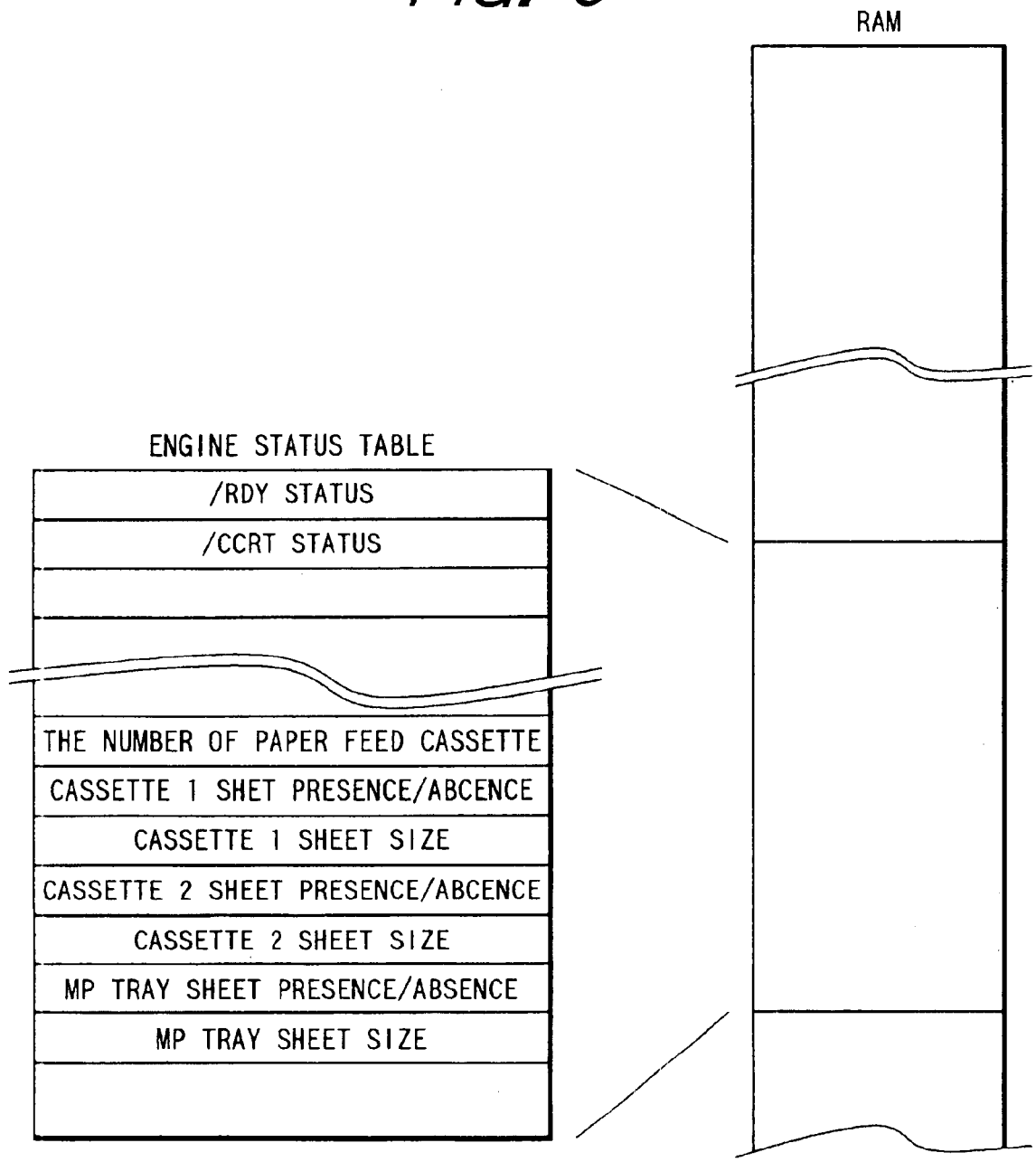
FIG. 6 is a view showing the map of a RAM 307 in the embodiment of the present invention.

FIG. 6 shows the configuration of the engine status table in the RAM 307.

The engine status table indicates the status of the printer engine 105 recognized by the printer controller 103. Such status may not be same as the actual status of the printer engine 105 but is renewed, reflecting the status of the printer engine 105 obtained by the predetermined communication at an arbitrary timing.

A "/RDY status" flag reflects the status of the /RDY signal and is rendered "true" when the engine monitoring task completes the process by detecting the "false" status of the /RDY signal.

A "/CCRT status" flag reflects the status of the /CCRT signal, and indicates the actual status of the /CCRT signal by the engine monitoring task. The /CCRT signal assumes the "false" state as explained before, when the engine monitoring task detects the "true" status of the /CCRT signal and acquires the status of the printer engine 105 by the predetermined communication.

A "sheet feeding cassette number" flag indicates the number of selectable sheet feeding cassettes, reflecting the presence/absence of an optional cassette unit.

A "cassette 1 sheet presence/absence" flag indicates the presence/absence of sheets in the cassette 210. A "cassette 1 sheet size" indicates the sheet size set by an unrepresented dial of the cassette 210, and such set size is recognized as the sheet size of the cassette 210 based on the assumption that the operator places the sheets of a size same as the size set by the dial.

A "cassette 2 sheet presence/absence" flag indicates the presence/absence of sheets in the cassette 250. A "cassette 2 sheet size" indicates the sheet size set by an unrepresented dial of the cassette 250, and such set size is recognized as the sheet size of the cassette 250 based on the assumption that the operator places the sheets of a size same as the size set by the dial.

These tables, though not shown in FIG. 5, are referred to and renewed by the analysis developing task, the tape operating task and the engine monitoring task.

Figure 7:
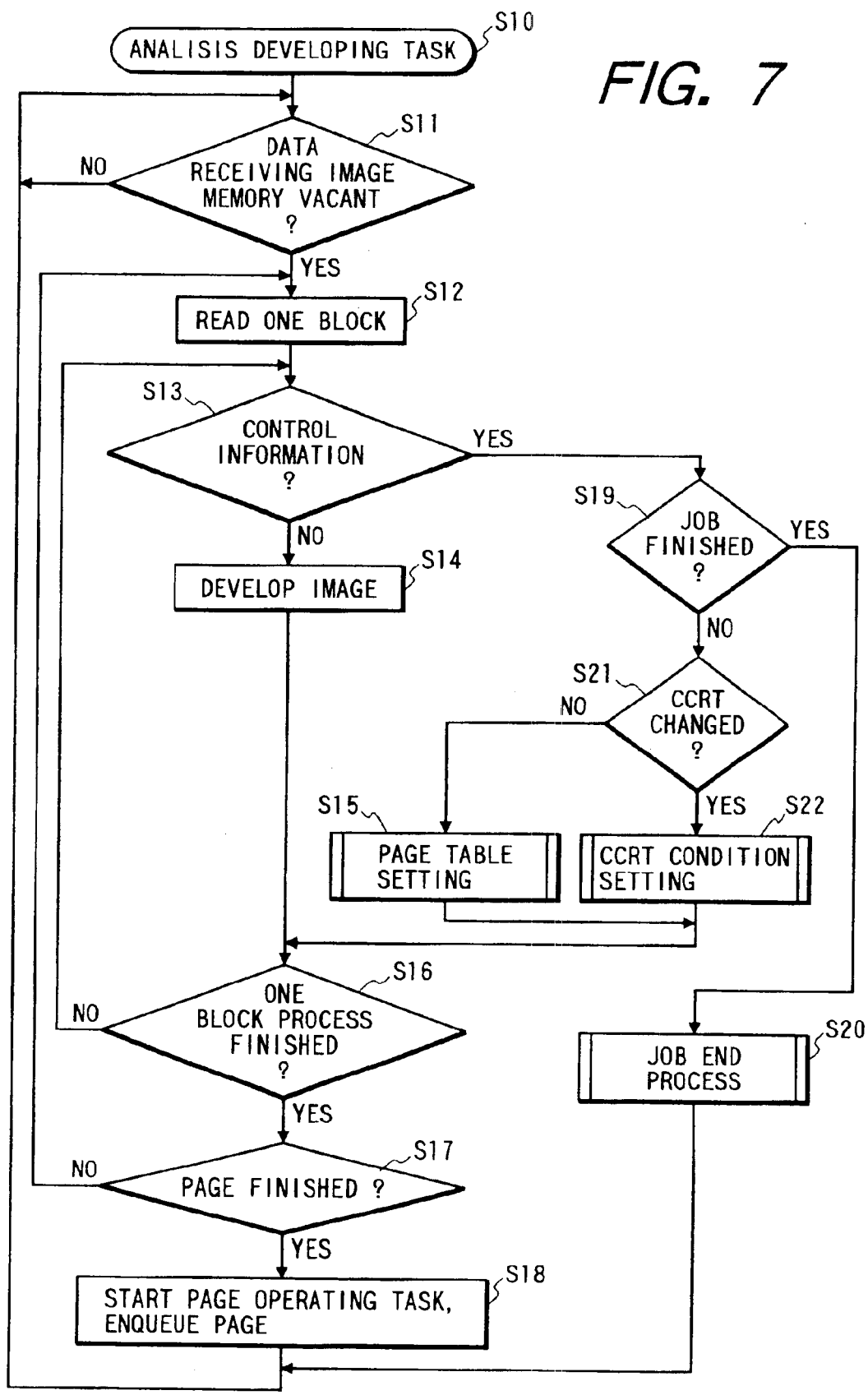
FIGS. 7, 8 and 9 are flow charts showing the function of a CPU 309 in the embodiment of the present invention.

FIG. 7 is a flow chart showing the control sequence of the analysis developing task, and the actual process is executed by the CPU 309.

The analysis developing task is activated when the power supply is turned on (S10).

At a suitable interval there are asked the presence of data reception to the host interface 302 and the empty area in the image memory 305 (S11).

If the data are present and the empty area is present in the image memory 305, a page table is acquired and the data of a predetermined block are read from the host interface 320 into a work area for the CPU 309, provided in the RAM 307 (S12).

The control codes and the data in such block are judged in succession (S13).

If the data of the above-mentioned block are image information, the data are subjected to image development either by the image data generation unit 303 or by the CPU 309, then the obtained image information is stored in a predetermined area of the image memory 305 (S14) and the sequence proceeds to a step S16.

In case the step S13 identifies that the data of the above-mentioned block are control information, there is further discriminated whether the data are a job end control code (S19).

If so, there is executed a predetermined job end process (S20) and the sequence returns to the step S11.

If not and if the data of the above-mentioned block are a CCRT change instruction (S21), the change of the condition for the CCRT signal is instructed to the engine by a predetermined command (S22).

If the step S21 identifies that the data of the above-mentioned block are other control information, the data are stored in the page table after predetermined data transformation (S15).

Then there is discriminated whether the process after the step S13 is completed for all the data of the entire block (S16), and, if not, the sequence returns to the step S13 to repeat the process.

If a page end code is not detected, the sequence returns to the step S12 to repeat the process in the unit of a block (S17).

After the end of a page, the above-mentioned operation system is asked to activate the page operating task, then the page table is encued to the page cue (S18), and the sequence returns to the step S11.

Figure 8:
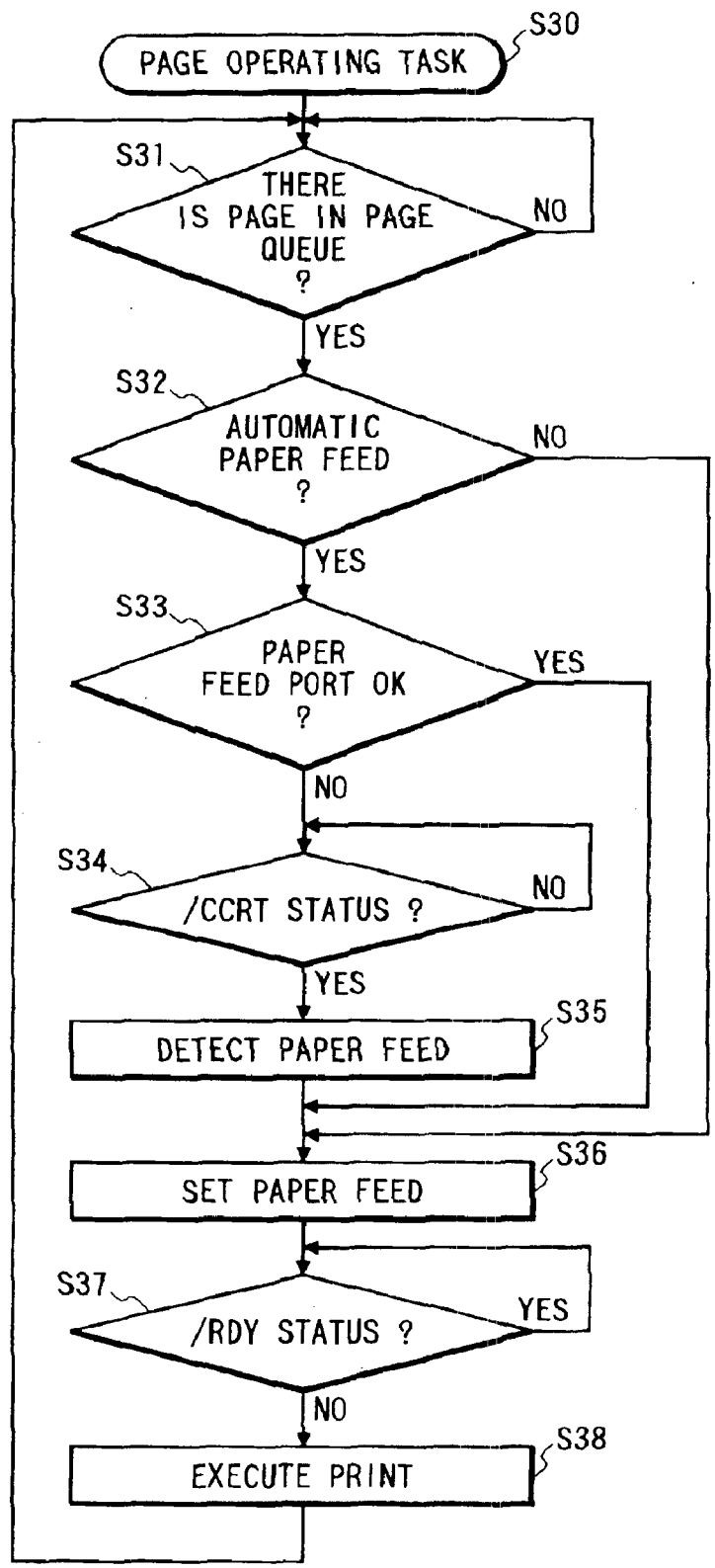

FIG. 8 is a flow chart showing the control sequence of the page operating task, and the actual process is executed by the CPU 309.

The page operating task is activated when the power supply is turned on (S30).

The printer controller 103 monitors the page cue at a predetermined interval, and, upon detecting the presence of data in the page cue, sets the control information of the page table to be printed actually in the printer engine 105 (S31).

There is discriminated whether the print mode is in an "automatic sheet feed" mode (S32).

In case of the "automatic sheet feed" mode, there is at first discriminated whether the presence/absence of sheet and the sheet size in the sheet feeding means, set currently in the printer engine 105 match the "requested sheet size" (S33). If not, there is referred to the "/CCRT status" in the engine status table (S34).

If it is "true", the system waits until it is changed to "false" (by the acquisition of the status of the printer engine 105 by the engine monitoring task through the predetermined communication). If it is "false", the sequence is continued, and predetermined searches are executed according to the "cassette presence/absence" and "sheet size" of the engine status table and the "requested sheet size" in the page table (S35).

On the other hand, the step S33 identifies a matching state, the setting of the sheet feeding means is made in the printer engine 105, if necessary (S36).

If the "print mode" is not the "automatic sheet feeding" mode (S32), the sheet feeding means of the "sheet feeding mode" of the page table is set in the printer engine 105 (S36).

Then the "/RDY status" of the engine status table is checked, and, if it is "false", the system waits until it is changed to "true" (S37). Then the printing is executed (S38), and the sequence returns to the step S31 for referring to the page table to be printed next.

Figure 9:
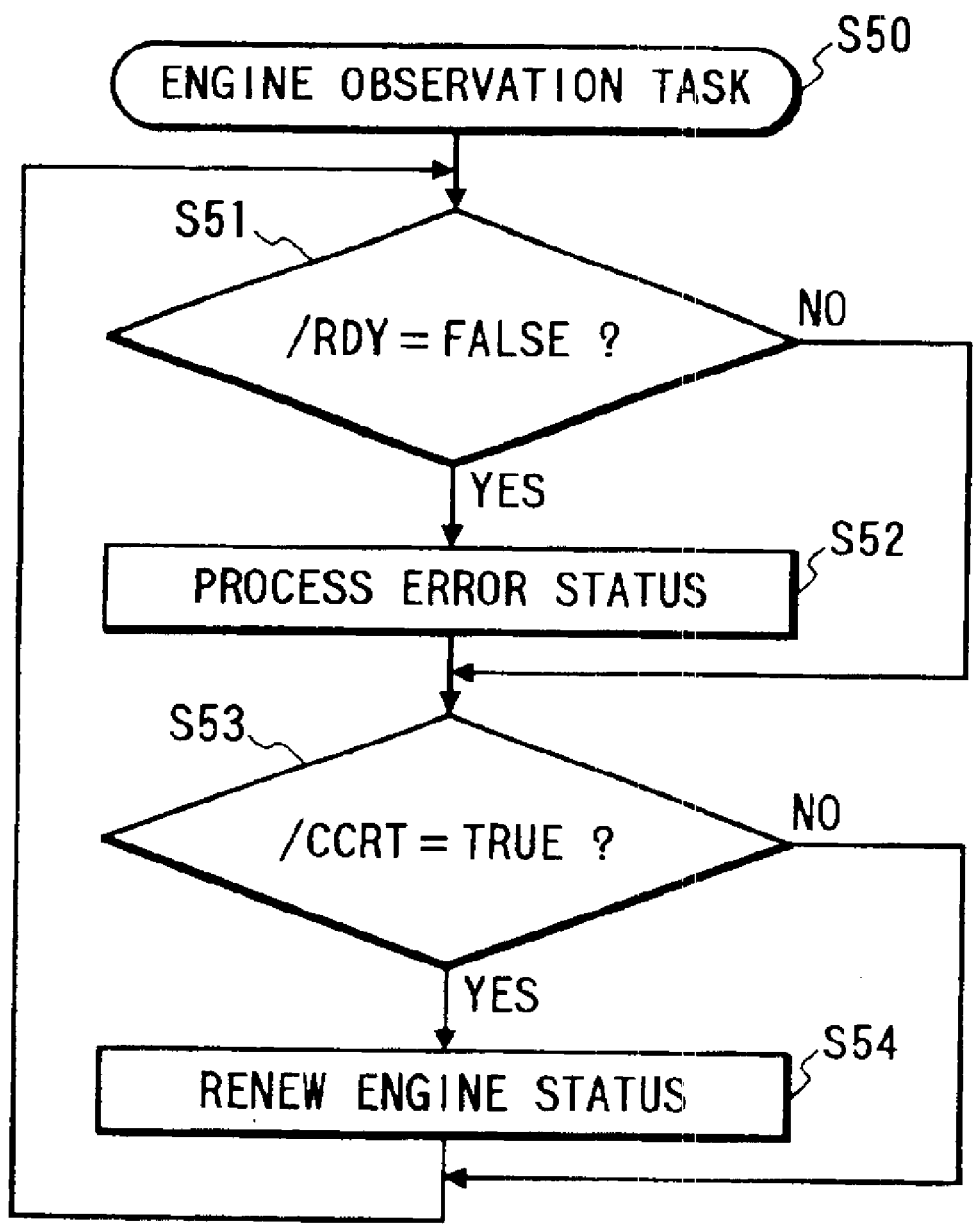
Figure 10:
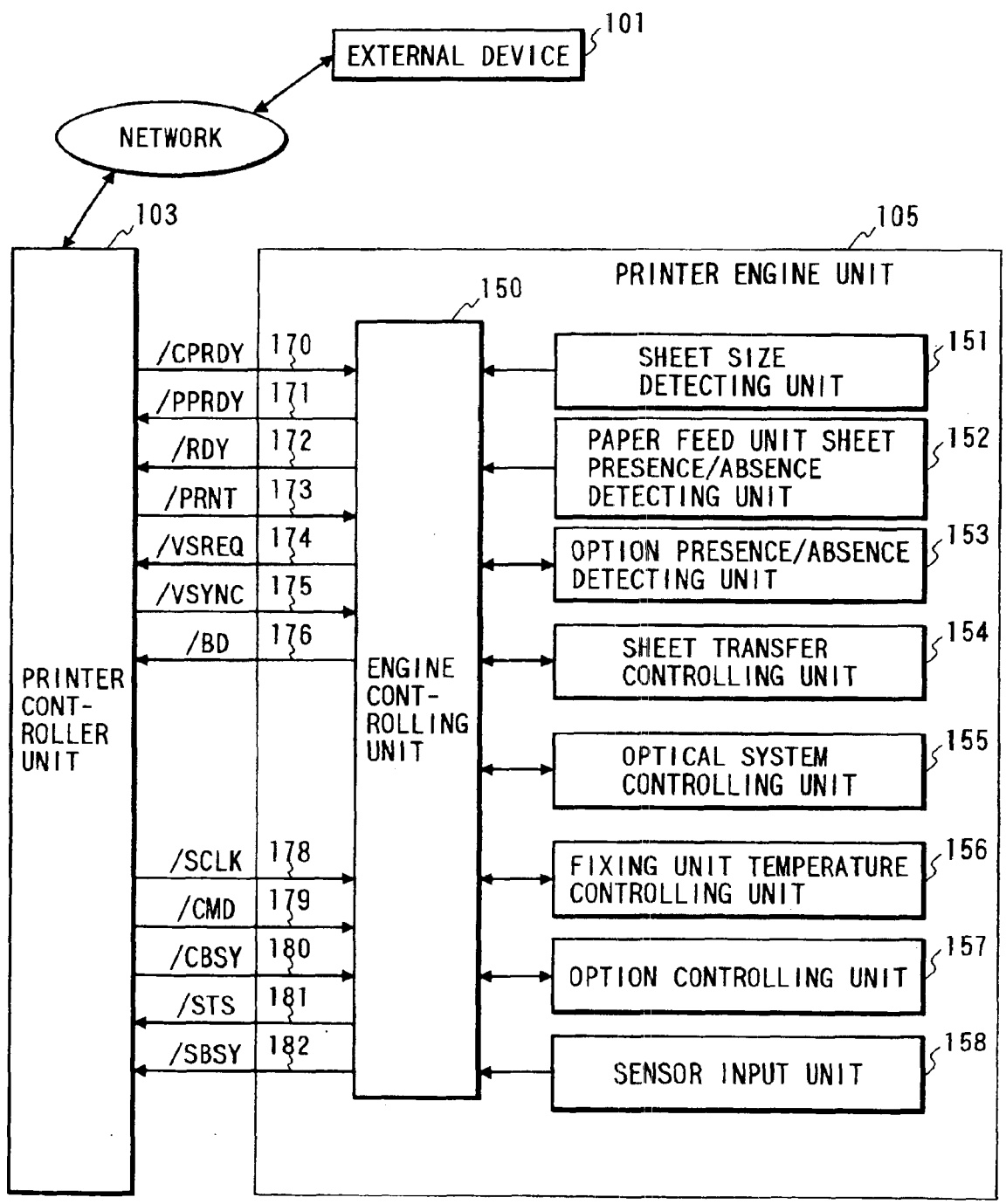
FIG. 10 is a block diagram showing the entire configuration of a conventional system.

FIG. 9 is a flow chart showing the control sequence of the engine monitoring task.

The engine monitoring task enters a suspended state immediately after activation when the power supply is turned on, but awakened by an interruption generated by the engine interface by a status change in the RDY signal or in the CCRT signal, and enters again the suspended state after repeating the following steps by a number of predetermined times.

At first the /RDY signal is checked and is reflected in the "/RDY status" in the engine status table, and, if a "false" status is detected (S51), there is executed the protocol 1 shown in FIG. 3 and the sequence proceeds to a predetermined error release waiting process (S52). In the step S52, the sequence waits until the /RDY signal assumes the "true" state by a predetermined error releasing process by the operator, such as the reselection of the sheet feeding means, the jam recovery or the door closing. Also the change of the status is informed to the external device 101 through the network.

Then the /CCRT signal is checked and is reflected in the "/CCRT status" in the engine status table, and, if a "true" status is detected (S53), there is executed the protocol 2 shown in FIG. 3 and the result is reflected in the corresponding status of the engine status table (S54). Also the change of the status is informed to the utility software of the external device 101 through the network.

In response to the received status, the utility software on the external device 101 executes a responsive operation such as the display of the status on the external device 101.

The control in the above-explained manner allows the change of the /CCRT signal 177 to function as a trigger for the printer engine 105 for checking the status, and the serial communication between the printer engine 105 and the printer controller 103 can be dispensed with except at the generation of such trigger.

Also the informing of the changed status to the utility software on the external device 101, based on the change of the /CCRT signal as the trigger for status check, allows to distribute the change of the status throughout the entire printing system in more speedy manner, whereby the responsive operations such as the information to the user can be achieved smoothly. Also the traffic on the network can be reduced, so that the throughput of the printing operation can be improved.

In the engine monitoring task, the status change can be acquired, as will be explained in the following, by referring to the status management table and discriminating whether or not to transmit a status change signal according to the CCRT condition of a certain level.

Figure 11:
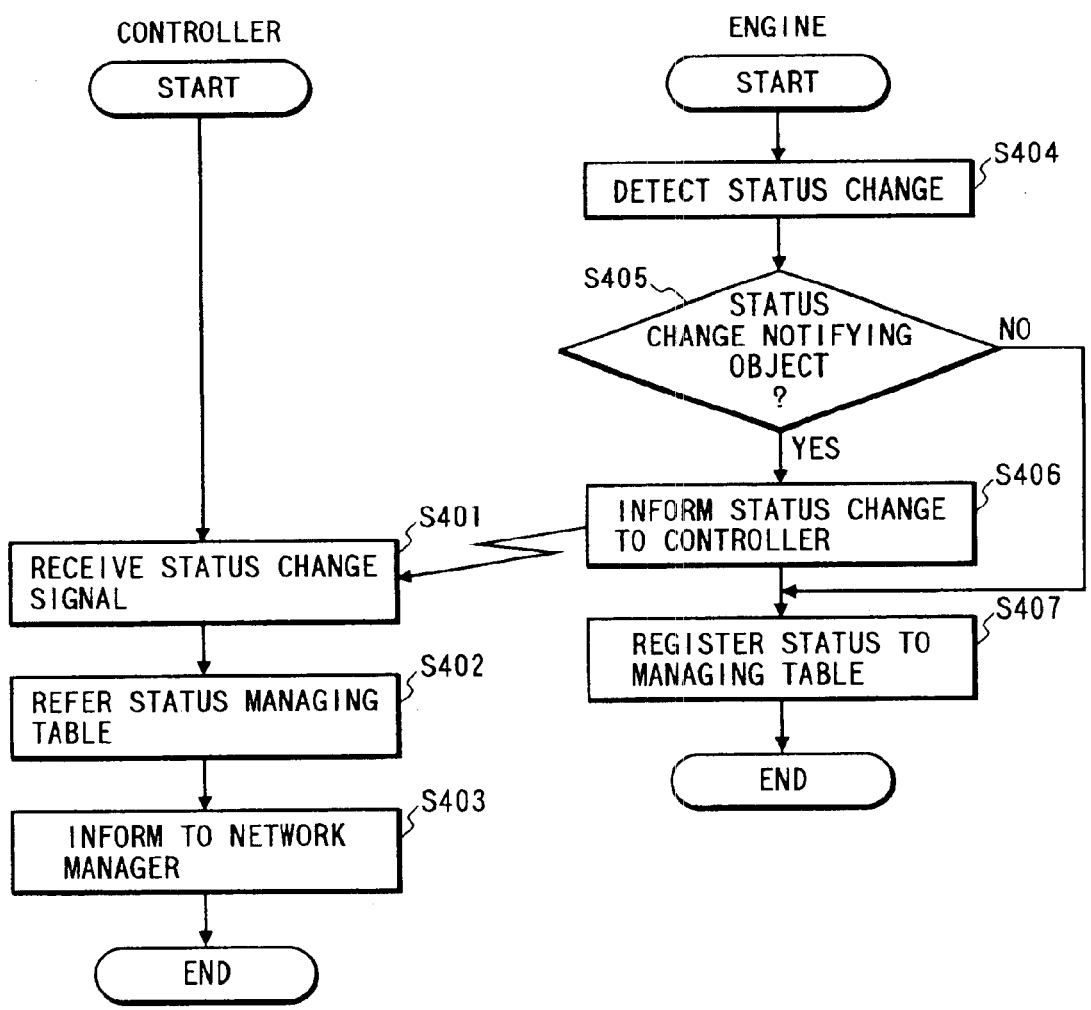
FIG. 11 is a flow chart showing a second configuration of the engine monitoring task.

In the following there will be explained, with reference to flow charts in FIGS. 11 and 12, a case where the engine controller 150 has two methods for acquiring the status change.

When the engine controller 150 detects a state change in the engine (S404), the engine controller discriminates whether it is within the object of informing of the status change (S405). If it is within the object of informing of the status change by the CCRT signal, the status change inside the engine is transmitted by the CCRT signal to the printer controller 103 (S406). After the status change is transmitted to the printer controller by the CCRT signal, or in case the state change is not within the object of informing of the status change by the CCRT signal, the item and status of such change are registered in the status management table.

On the other hand, when the printer controller 103 detects the status change signal from the engine controller 150 (S401), it immediately refers to the status management table to recognize the change of the status in the engine controller (S402).

It then effects control in such a manner as to transmit the changed status only to the external devices which should receive such status information, such as the network manager, and not to transmit to other external devices which should not receive such information. Whether the external device should receive the changed status is discriminated by referring to a transmission object discrimination table stored in the RAM 307 or in the EEPROM 310. This transmission object discrimination table stores data, indicating whether the status is to be transmitted, for each connected external device (S403).

Figure 12:
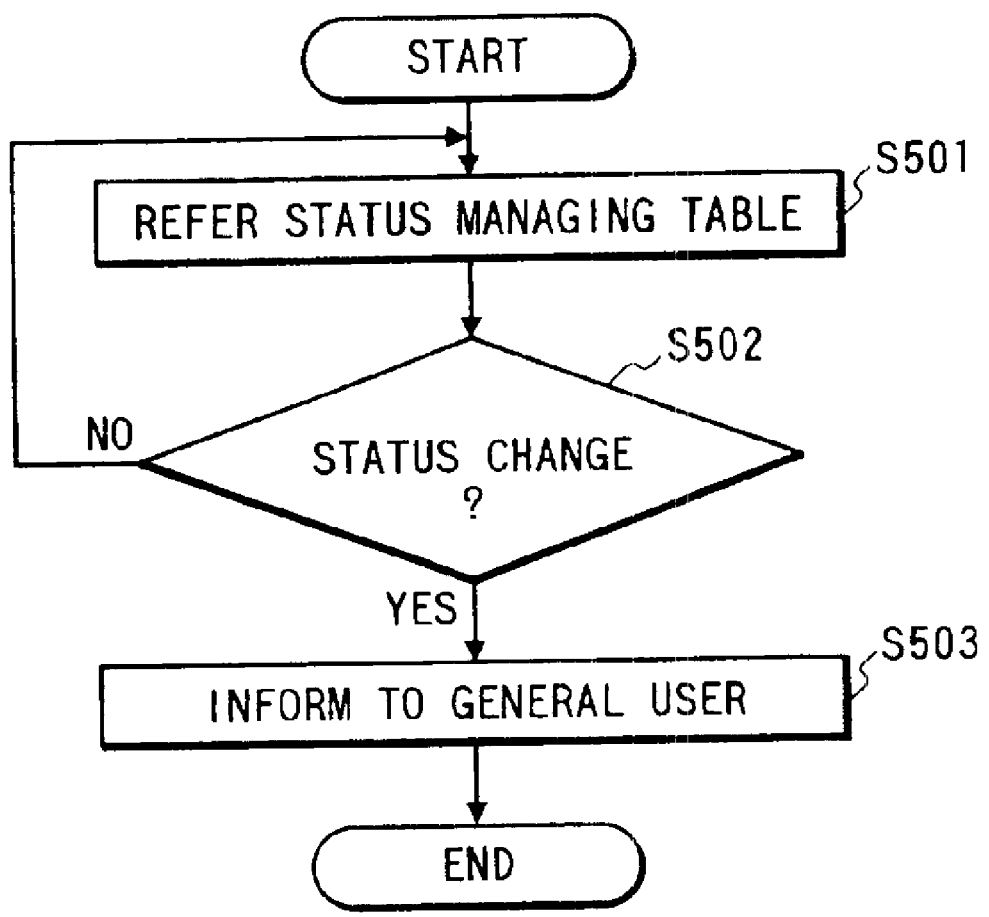
FIG. 12 is a flow chart showing a third configuration of the engine monitoring task.

FIG. 12 shows a third method for acquiring the status change in the engine controller 150.

The printer controller 103 refers to the status management table regardless of the status of the engine controller 150 (S501), and, if a status change is present in the engine controller 150 in comparison with the status at the preceding reference (S502), it recognizes the change of the status of the engine controller 150 and informs the general user of the item and function of such change (S503).

In the foregoing there has been explained the method of informing to the network manager and to the general network users, but such informing may also be made by setting priority among the network users.

As explained in the foregoing, the present invention allows to realize inexpensive and efficient transmission of information, in the use of high-speed but costly CCRT (condition change reporting) signal, by adopting a method of utilizing the CCRT signal for acquiring and informing the information of an important status change for the level of the network manager such as an error or an operator call, but utilizing the palling for acquiring and informing a status change of the level of the general network users such as a sheet size change.

The present embodiment is applied to a laser beam printer suitable for the present invention, but the present invention is naturally applicable for example also to an ink jet printer, a facsimile apparatus, a copying apparatus or a composite apparatus thereof as long as the unit controlling the printing process is separated from the unit controlling the image development and other processes.

As explained in the foregoing, the printing apparatus of the present invention is featured by providing a signal line linked with the status change which is not related to the /RDY signal, reducing the frequency of the aforementioned serial communication, thereby reducing the load of the printer controller 103, also utilizing the above-mentioned status change as a trigger for enabling to acquire the change of the sheet transport state or the like in more real-time manner, and informing the utility software on the external device connected to the network with such change there by achieving the responsive operations in more prompt manner.

Also the unification of the condition for change is the above-mentioned signal line for the printer connected to the network allows to manage the error information etc. of the printer connected to the same network under a same condition and to dispense with the unnecessary polling operation in the utility software on the external device, thereby reducing the traffic on the network.

The resulting reduction in the frequency of the communication reduces the load of the printer controller and improves the real-time nature of the responsive operations of the utility software on the external device in response to the status change of the printer.

On the other hand, the unification of the condition for change in the signal line for the printer connected to the network allows to manage the error information etc. for the printers connected to the same network under a same condition, thereby dispensing with the unnecessary polling in the utility software and reducing the network traffic.

What is claimed is:

1. An output control apparatus for communicating with an external apparatus to receive output data from the external apparatus and to transmit status information to the external apparatus, and for controlling an output unit to output an image based on the received output data, said apparatus comprising:
    an interface unit, adapted for interfacing with the output unit to transmit information including a print request to the output unit and to receive a condition change signal and status information from the output unit, wherein the condition change signal is provided by the output unit when one or more of a plurality of condition changes occurs in the output unit;
    a detection unit, adapted for detecting the condition change signal provided by the output unit via the interface unit;
    a recognition unit, adapted for analyzing the status information received from the output unit via the interface unit and for recognizing which one or more of the plurality of condition changes caused the condition change signal to be output by the output unit; and
    a transmission unit, adapted for transmitting status information based on the status information received from the output unit via the interface unit to the external apparatus in accordance with said detection unit detecting the condition change signal.

2. An output control apparatus according to claim 1, further comprising a reception unit adapted for receiving the output data from the external apparatus, wherein the external apparatus is a host computer.

3. An output control apparatus according to claim 1, further comprising a development unit adapted for developing the output data into image data, and a sending unit adapted for sending the image data developed by said development unit to the output unit.

4. An output apparatus according to claim 1, wherein said transmission unit transmits the status information to a utility software on the external apparatus.

5. An output control apparatus according to claim 1, further comprising a selection unit adapted for selecting at least one type of condition change from among the plurality of types of condition changes of the output unit in accordance with an instruction from the external apparatus, wherein the output unit provides the condition change signal when the selected type of condition change occurs.

6. An output control apparatus according to claim 1, wherein the plurality of types of condition changes of the output unit include at least one of a paper size change, a paper presence/absence change, and a function change in a paper feeding section.

7. An output control apparatus according to claim 1, further comprising:
    a determination unit, adapted for determining whether the status information is to be transmitted; and
    a control unit, adapted for controlling said transmission unit not to transmit the status information in a case where said determination unit determines that the status information is not to be transmitted.

8. An output control apparatus according to claim 7, wherein said determination unit makes a determination based on predetermined setting information.

9. An output control apparatus according to claim 1, wherein the output unit comprises a printer.

10. An output control apparatus according to claim 1, wherein said transmission unit transmits the status information to the external apparatus in accordance with said detection unit detecting the condition change signal, even if the external apparatus does not request the status information.

11. An output control apparatus according to claim 1, wherein the output unit discriminates whether the at least one type of condition change which occurs in the output unit is a predetermined type of condition change, and provides the condition change signal to said output control apparatus in a case where the at least one type of condition change which occurs in the output unit is the predetermined type of condition change.

12. An output control method for communicating with an external apparatus to receive output data from the external apparatus and to transmit status information to the external apparatus, and for controlling an output unit to output an image based on the received output data, said method comprising the steps of:
    interfacing with the output unit to transmit information including a print request to the output unit and to receive a condition change signal and status information from the output unit, wherein the condition change signal is provided by the output unit when one or more of a plurality of condition changes occurs in the output unit;
    detecting the condition change signal provided by the output unit in said interfacing step;
    recognizing, using the status information received from the output unit in said interfacing step, which one or more of the plurality of condition changes caused the condition change signal to be output by the output unit; and transmitting status information based on the status information received from the output unit in said interfacing step to the external apparatus in accordance with detection of the condition change signal in said detecting step.

13. An output control method according to claim 12, further comprising a reception unit adapted for receiving the output data from the external apparatus, wherein the external apparatus is a host computer.

14. An output control method according to claim 12, further comprising the step of developing the output data into image data, and a sending step of sending the image data developed in said development step to the output unit.

15. An output control method according to claim 12, wherein said transmitting step includes transmitting the status information to a utility software on the external apparatus.

16. An output control method according to claim 12, further comprising the step of selecting at least one type of condition change from among the plurality of types of condition changes of the output unit in accordance with an instruction from the external apparatus, wherein the output unit provides the condition change signal when the selected type of condition change occurs.

17. An output control method according to claim 12, wherein the plurality of types of condition changes of the output unit include at least one of a paper size change, a paper presence/absence change, and a function change in a paper feeding section.

18. An output control method according to claim 12, further comprising the steps of:
   determining whether the status information is to be transmitted; and
   controlling performance of said transmitting step not to transmit the status information in a case where said determining step determines that the status information is not to be transmitted.

19. An output control method according to claim 18, wherein said determining step makes a determination based on predetermined setting information.

20. An output control method according to claim 12, wherein the output unit comprises a printer.

21. An output control method according to claim 12, wherein said transmitting step transmits the status information to the external apparatus in accordance with said detection step detecting the condition change signal, even if the external apparatus does not request the status information.

22. An output control method according to claim 12, wherein the output unit discriminates whether the at least one type of condition change which occurs in the output unit is a predetermined type of condition change, and provides the condition change signal in a case where the at least one type of condition change which occurs in the output unit is the predetermined type of condition change.

23. A computer-readable medium containing code to control a processor-controlled output control apparatus to perform a method for communicating with an external apparatus to receive output data from the external apparatus and to transmit status information to the external apparatus, and for controlling an output unit to output an image based on the received output data, the method comprising the steps of:
   interfacing with the output unit to transmit information including a print request to the output unit and to receive a condition change signal and status information from the output unit, wherein the condition change signal is provided by the output unit when one or more of a plurality of condition changes occurs in the output unit;
   detecting the condition change signal provided by the output unit in said interfacing step;
   recognizing, using the status information received from the output unit in the interfacing step, which one or more of the plurality of condition changes caused the condition change signal to be output by the output unit; and
   transmitting status information based on the status information received from the output unit in said interfacing step to the external apparatus in accordance with detection of the condition change signal in said detecting step.

* * * * *

UNITED STATES PATENT AND TRADEMARK OFFICE
CERTIFICATE OF CORRECTION

PATENT NO.         : 6,903,832 B2                                    Page 1 of 1
APPLICATION NO. : 08/907957
DATED              : June 7, 2005
INVENTOR(S)        : Maekawa et al.

It is certified that error appears in the above-identified patent and that said Letters Patent is hereby corrected as shown below:

ABSTRACT:
Line 4, "includes detection means" should read -- includes a detection unit --;
Line 6, "unit, and transmission means" should read -- unit via an interface unit, and a transmission unit --; and
Line 8, "means" should read -- unit --.

DRAWINGS:
Sheet 4, FIG. 5, "DAT" should read -- DATA --;
Sheet 5, FIG. 6, "SHET" should read -- SHEET --, and "ABCENCE" (both occurrences) should read -- ABSENCE --; and
Sheet 6, FIG. 7, "ANALISIS" should read -- ANALYSIS --.

COLUMN 5:
Line 36, "bit;" should read -- bit. --.

COLUMN 10:
Line 65, "palling" should read -- polling --.

Signed and Sealed this

Second Day of October, 2007

JON W. DUDAS
*Director of the United States Patent and Trademark Office*